United States Patent
Ferguson et al.

(10) Patent No.: US 10,623,244 B2
(45) Date of Patent: Apr. 14, 2020

(54) DATA TRANSFER ON AN INDUSTRIAL PROCESS NETWORK

(71) Applicant: Emerson Process Management LLLP, Eden Praire, MN (US)

(72) Inventors: Anthony Dean Ferguson, Minnetrista, MN (US); Brian Alan Franchuk, Richfield, MN (US); Thomas Marvin Bell, Lakeville, MN (US)

(73) Assignee: Emerson Process Management LLLP, Eden Prairie, MN (US)

( * ) Notice: Subject to any disclaimer, the term of this patent is extended or adjusted under 35 U.S.C. 154(b) by 402 days.

(21) Appl. No.: 14/576,778

(22) Filed: Dec. 19, 2014

(65) Prior Publication Data

US 2016/0182285 A1 Jun. 23, 2016

(51) Int. Cl.
*H04L 12/24* (2006.01)
*H04L 29/08* (2006.01)
(Continued)

(52) U.S. Cl.
CPC ...... *H04L 41/0806* (2013.01); *H04L 41/0846* (2013.01); *H04L 67/12* (2013.01);
(Continued)

(58) Field of Classification Search
CPC ......... H04L 67/34; H04L 67/12; H04L 69/04; H04L 67/2828; H04L 41/0806; H04W 76/021; H04W 4/06
See application file for complete search history.

(56) References Cited

U.S. PATENT DOCUMENTS 7,013,184 B2   3/2006   Romagnoli et al.
7,984,199 B2   7/2011   Ferguson et al.
(Continued)

FOREIGN PATENT DOCUMENTS

CN    1675886 A    9/2005
CN    101460928 A   6/2009
(Continued)

OTHER PUBLICATIONS

International Search Report and Written Opinion from PCT Application Serial No. PCT/US2015/058766, dated Feb. 15, 2016, 16 pages.

(Continued)

*Primary Examiner* — Philip J Chea
*Assistant Examiner* — Wuji Chen
(74) *Attorney, Agent, or Firm* — Kinney & Lange, P.A.

(57) ABSTRACT

Enhanced communication protocols can improve reliability and efficiency of data transfers between a host device and one or more field devices on an industrial process network. A field device can store a device description that includes a plurality of parameters descriptive of functional attributes of the field device. A host device can upload the device description for use in communications with the field device. The field device can further store a plurality of storable configurations, each storable configuration representing an entire configuration of the field device. The host device can upload the plurality of storable configurations from the field device, such as to transfer the storable configurations to a second field device on the same or different network. The host device can transmit a configuration activation request to cause a field device to operate in accordance with configuration data included in a selected one of the plurality of storable configurations.

8 Claims, 10 Drawing Sheets

(51) Int. Cl.
*H04L 29/06* (2006.01)
*H04W 4/06* (2009.01)

(52) U.S. Cl.
CPC .............. *H04L 67/34* (2013.01); *H04L 69/04* (2013.01); *H04W 4/06* (2013.01); *H04L 67/2828* (2013.01)

(56) References Cited

U.S. PATENT DOCUMENTS

| | | | |
|---|---|---|---|
| 2003/0093460 A1 | 5/2003 | Kinney et al. | |
| 2007/0250180 A1* | 10/2007 | Bump | G05B 19/41845 700/1 |
| 2009/0228611 A1* | 9/2009 | Ferguson | G06F 8/60 710/8 |
| 2010/0299517 A1* | 11/2010 | Jukic | H04L 12/2809 713/150 |
| 2012/0004743 A1 | 1/2012 | Anne et al. | |
| 2012/0059898 A1* | 3/2012 | Blackwell | G06F 17/2247 709/208 |
| 2012/0093242 A1* | 4/2012 | Wallace | G05B 19/042 375/259 |
| 2012/0250544 A1* | 10/2012 | Sasaki | G05B 19/4184 370/252 |
| 2012/0254339 A1* | 10/2012 | Holmes | G05B 19/4185 709/212 |
| 2012/0324065 A1* | 12/2012 | Yang | H04L 41/082 709/221 |
| 2013/0116804 A1* | 5/2013 | Extra | G05B 13/02 700/82 |
| 2014/0282585 A1* | 9/2014 | Dictos | G06F 16/1858 718/104 |

FOREIGN PATENT DOCUMENTS

| | | |
|---|---|---|
| CN | 101960417 A | 1/2011 |
| CN | 102445928 A | 5/2012 |
| CN | 102736575 A | 10/2012 |
| WO | WO2004015956 A2 | 2/2004 |
| WO | WO2004015956 A3 | 2/2004 |
| WO | WO2011045719 A1 | 4/2011 |
| WO | WO2011059978 A1 | 5/2011 |

OTHER PUBLICATIONS

International Preliminary Report on Patentability for PCT Application No. PCT/US2015/058766, dated Jun. 20, 2017, 13 pages.
Extended European Search Report for European Patent Application No. 15870539.2, dated May 22, 2018, 9 pages.
Chinese Office Action for Chinese Patent Application No. 201510133575.5, dated Jan. 24, 2019, 22 pages.
Japanese Office Action for Japanese Patent Application No. 2017-551994, dated Aug. 28, 2019, 6 pages.
Chinese Second Office Action for Chinese Patent Application No. 201510133575.5, dated Oct. 14, 2019, 29 pages.

* cited by examiner

DATA TRANSFER ON AN INDUSTRIAL PROCESS NETWORK

BACKGROUND

The present disclosure relates generally to data transfer on an industrial process network. More particularly, the present disclosure relates to data transfers between field devices and a host device on the industrial process network.

In a typical industrial plant, a distributed control system (DCS) is used to control many of the industrial processes performed at the plant. Typically, the plant has a centralized control room having a computer system with user input/output (I/O), disc I/O, and other peripherals. Coupled to the computer system are a controller and a process I/O subsystem. The process I/O subsystem includes I/O ports, which are connected to various field devices throughout the plant. Field devices include various types of analytical equipment, such as pressure sensors, temperature sensors, switches, transducers, valve positioners and actuators, as well as any other device that performs a function in a distributed control system.

Traditionally, analog field devices have been connected to the control room by two-wire twisted pair current loops, with each device connected to the control room by a single two-wire twisted pair. Analog field devices are capable of responding to or transmitting an electrical signal within a specified range. In a typical configuration, it is common to have a voltage differential of approximately 20-25 volts between the two wires of the pair and a current of 4-20 milliamps running through the loop. An analog field device that transmits a signal to the control room modulates the current running through the current loop, with the current proportional to a sensed process variable. On the other hand, an analog field device that performs an action under control of the control room is controlled by the magnitude of the current through the loops, which is modulated by the I/O port of the process I/O system, which in turn is controlled by the controller.

Historically, most traditional field devices have had either a single input or a single output that was directly related to the primary function performed by the field device. For example, often the only function implemented by a traditional analog resistive temperature sensor is to transmit a temperature by modulating the current flowing through the two-wire twisted pair, while the only function implemented by a traditional analog valve positioner is to position a valve between an open and closed position based on the magnitude of the current flowing through the two-wire twisted pair.

More recently, hybrid systems that superimpose digital data on the current loop have been used in process control systems. One hybrid system is known in the control art as the Highway Addressable Remote Transducer (HART) and is similar to the Bell 202 modem specification. The HART system uses the magnitude of the current in the current loop to sense a process variable (as in the traditional system), but also superimposes a digital carrier signal upon the current loop signal. The carrier signal is relatively slow, and can provide updates of a secondary process variable at a rate of approximately 2-3 updates per second. Generally, the digital carrier signal is used to send secondary and diagnostic information and is not used to realize the primary control function of the field device. Examples of information provided over the carrier signal include secondary process variables, diagnostic information (including sensor diagnostics, device diagnostics, wiring diagnostics, and process diagnostics), operating temperatures, temperature of the sensor, calibration information, device identification information, materials of construction, configuration or programming information, or other types of information. Accordingly, a single hybrid field device may have a variety of input and output variables and may implement a variety of functions.

Foundation Fieldbus is a multi-drop serial digital two-way communications protocol defined by the Instrument Society of America (ISA), and is intended for connecting field instruments and other process devices (e.g., monitoring and simulation units) in distributed control systems. Foundation Fieldbus allows enhanced digital communication over previous process control loop methods while maintaining the ability to power process devices coupled to the Fieldbus loop and while meeting intrinsic safety requirements. For instance, the Foundation Fieldbus specification (i.e., including the physical layer specification and the data link layer specification) defines networks that transmit data at much higher data rates than traditional hybrid systems, such as at data rates up to 31.25 kilobits per second (Kbps) for an H1 Fieldbus network and data rates up to 2.5 megabits per second (Mbps) for an H2 Fieldbus network.

To improve interoperability of field devices on a Fieldbus network, operational interfacing (e.g., data interpretation) and configuration of a field device are typically achieved using a device description (DD). A DD often takes the form of one or more files formatted according to a device description language (DDL) to define functional attributes of the field device, such as data output types, valid data ranges and/or units, calibration and/or diagnostic parameters, or other functional attributes. According to the DD associated with a field device, a host or other configuration device can transmit configuration data to the field device via a series of sequential messages to define an operational state of the field device. For instance, a host device can interpret the DD associated with the field device via the DDL to determine functional attributes corresponding to the field device. Thereafter, the host device can transmit configuration data to define a particular operational state of the field device, such as configuration data that specifies an output data type, calibration information corresponding to the output data, units of the data, or other configuration data.

In this way, a host or other configuration device can interface with and/or configure any (e.g., each) of a plurality of field devices by interpreting, via the DDL, a DD associated with the respective field device. However, interactions with field devices using DDs require that a host device have access to the DDs corresponding to each of the respective field devices. As each DD describes functional attributes of the particular field device to which it corresponds, DDs often differ between field devices on the network. Access to specific DDs can be complicated by the fact that host devices are often disconnected from wide area networks, such as the Internet, for security reasons. Accordingly, in cases where a host device does not have access to a particular DD, retrieval of that DD can be cumbersome, time consuming, and error prone.

Moreover, transactions involving large amounts of data over the Fieldbus network, such as uploads and downloads of configuration data and/or software images, can be relatively slow, sometimes taking an hour or more to complete the transaction. That is, the Fieldbus Message Specification (FMS) defines a messaging protocol for communications over the Fieldbus, accomplished via Virtual Communication Relationships (VCRs). The VCRs provide connection-based channels for the transfer of data between applications and/or devices. Devices on the Fieldbus network communicate via both scheduled and unscheduled communications managed by a Link Master (LM) device that is designated as the Link Active Scheduler (LAS). During scheduled communications, the LAS device issues a compel data message to a field device. In response, the field device publishes data over the network to one or more subscriber devices. Unscheduled communications are accomplished via a token passing algorithm managed by the LAS device. The LAS device issues a pass token message, in turn, to each device included in a list of active devices on the network, often referred to as the live list. Upon receiving the pass token message, a field device transmits any unscheduled data until all of its data has been published or a configurable "maximum token hold time" has expired.

Due to the connection-based nature of the VCRs, data transmissions are accomplished via a series of messages, each requiring a corresponding acknowledgment. Unacknowledged messages are retransmitted, thereby increasing robustness of communications, but also introducing overhead to the communications scheme, which is time-limited by the maximum token hold time allotted to each device for unscheduled communications. Accordingly, data transactions involving large amounts of data, such as configuration files and/or DDs, can be time consuming, thereby increasing the time and expense associated with commissioning of devices and configuration of Fieldbus networks.

SUMMARY

In one example, a method of uploading a device description of a field device from the field device to a host device on an industrial process network includes transmitting, by the host device to the field device, a device description upload request to request the field device to upload the device description from the field device to the host device. The device description includes a plurality of parameters descriptive of functional attributes of the field device. The device description is stored in a non-volatile memory of the field device. The method further includes receiving, by the host device, the device description via one or more communication messages from the field device.

In another example, a method of uploading a device description of a field device from the field device to a host device on an industrial process network includes receiving, by the field device from the host device, a device description upload request to request the field device to upload the device description from the field device to the host device. The device description includes a plurality of parameters descriptive of functional attributes of the field device. The device description is stored in a non-volatile memory of the field device. The method further includes transmitting, by the field device, the device description via one or more communication messages to the host device responsive to receiving the device description upload request.

In another example, a field device includes at least one processor, one or more storage devices, and a transceiver configured to send and receive data over an industrial process network. The one or more storage devices store a device description of the field device, the device description including a plurality of parameters descriptive of functional attributes of the field device. The one or storage devices are encoded with instructions that, when executed by the at least one processor, cause the field device to receive, via the transceiver, a device description upload request to request the field device to upload the device description to a host device, and transmit, to the host device via the transceiver, the device description via one or more communication messages responsive to receiving the device description upload request.

In another example, a host device includes at least one processor, one or more storage devices, and a transceiver configured to send and receive data over an industrial process network. The one or more storage devices are encoded with instructions that, when executed by the at least one processor, cause the host device to transmit, to a field device, a device description upload request to request the field device to upload a device description from the field device to the host device. The device description includes a plurality of parameters descriptive of functional attributes of the field device. The device description is stored in a non-volatile memory of the field device. The one or more storage devices are further encoded with instructions that, when executed by the at least one processor, cause the host device to receive the device description via one or more communication messages from the field device, and store the device description in the one or more storage devices.

In another example, a method of configuring a field device on an industrial process network includes selecting, by a host device, one of a plurality of storable configurations stored in a non-volatile memory of the field device. Each storable configuration of the plurality of storable configurations includes configuration data used to configure one or more functional attributes of the field device and represents an entire configuration of the field device. The method further includes transmitting, by the host device to the field device, a configuration activation request that includes an identification of the selected one of the plurality of storable configurations, the configuration activation request configured to request the field device to operate in accordance with configuration data included within the selected one of the plurality of storable configurations.

In another example, a method of configuring a field device on an industrial process network includes receiving, by the field device from a host device, a configuration activation request that includes an identification of a selected one of a plurality of storable configurations stored in a non-volatile memory of the field device. Each storable configuration of the plurality of storable configurations includes configuration data used to configure one or more functional attributes of the field device and represents an entire configuration of the field device. The method further includes activating, by the field device in response to receiving the configuration activation request, the identified one of the plurality of storable configurations stored in the non-volatile memory of the field device. The method further includes operating, by the field device, in accordance with the functional attributes configured using the configuration data included in the selected one of the storable configurations.

In another example, a host device includes at least one processor, one or more storage devices, and a transceiver configured to send and receive data over an industrial process network. The one or more storage devices are encoded with instructions that, when executed by the at least one processor, cause the host device to select one of a plurality of storable configurations stored in a non-volatile memory of a field device. Each storable configuration of the plurality of storable configurations includes configuration data used to configure one or more functional attributes of the field device and represents an entire configuration of the field device. The one or more storage devices are further encoded with instructions that, when executed by the at least one processor, cause the host device to transmit, to the field device via the transceiver, a configuration activation request that includes an identification of the selected one of the plurality of storable configurations, the configuration activation request configured to request the field device to operate in accordance with configuration data included within the selected one of the plurality of storable configurations.

In another example, a field device includes at least one processor, one or more storage devices, and a transceiver configured to send and receive data over an industrial process network. The one or more storage devices store a plurality of storable configurations, each storable configuration of the plurality of storable configurations including configuration data used to configure one or more functional attributes of the field device and representing an entire configuration of the field device. The one or more storage devices are encoded with instructions that, when executed by the at least one processor, cause the field device to receive, via the transceiver, a configuration activation request that includes an identification of a selected one of the plurality of storable configurations, activate, in response to receiving the configuration activation request, the identified one of the plurality of storable configurations stored in the one or more storage devices, and operate in accordance with the functional attributes configured using the configuration data included in the selected one of the storable configurations.

In another example, a method of transferring configuration data on an industrial process network includes transmitting, by a host device to a field device, a configuration data upload request to request the field device to upload a plurality of storable configurations stored in a non-volatile memory of the field device from the field device to the host device. Each storable configuration of the plurality of storable configurations includes configuration data used to configure one or more functional attributes of the field device and represents an entire configuration of the field device. The method further includes receiving, by the host device, the plurality of storable configurations via one or more communication messages from the field device, and storing, by the host device, the plurality of storable configurations in a non-volatile memory of the host device.

In another example, a method of transferring configuration data on an industrial process network includes receiving, by a field device from a host device, a configuration data upload request to request the field device to upload a plurality of storable configurations stored in a non-volatile memory of the field device from the field device to the host device. Each storable configuration of the plurality of storable configurations includes configuration data used to configure one or more functional attributes of the field device and represents an entire configuration of the field device. The method further includes transmitting, by the field device responsive to receiving the configuration data upload request, the plurality of storable configurations via one or more communication messages.

In another example, a host device includes at least one processor, one or more storage devices, and a transceiver configured to send and receive data over an industrial process network. The one or more storage devices are encoded with instructions that, when executed by the at least one processor, cause the host device to transmit, to a field device via the transceiver, a configuration data upload request to request the field device to upload a plurality of storable configurations stored in a non-volatile memory of the field device from the field device to the host device. Each storable configuration of the plurality of storable configurations includes configuration data used to configure one or more functional attributes of the field device and represents an entire configuration of the field device. The one or more storage devices are further encoded with instructions that, when executed by the at least one processor, cause the host device to receive, via the transceiver and responsive to transmitting the configuration data upload request, the plurality of storable configurations via one or more communication messages from the field device, and store the plurality of storable configurations in the one or more storage devices.

In another example, a field device includes at least one processor, one or more storage devices, and a transceiver configured to send and receive data over an industrial process network. The one or more storage devices store a plurality of storable configurations, each storable configuration of the plurality of storable configurations including configuration data used to configure one or more functional attributes of the field device and representing an entire configuration of the field device. The one or more storage devices are encoded with instructions that, when executed by the at least one processor, cause the field device to receive, via the transceiver, a data upload request from the host device to request the field device to upload the plurality of storable configurations to the host device, and transmit, via the transceiver responsive to receiving the configuration data upload request, the plurality of storable configurations.

DETAILED DESCRIPTION

As described herein, a host device can interface with a field device using a device description (DD) descriptive of functional attributes of the field device, such as data type attributes, calibration attributes, or other such functional attributes. According to techniques of this disclosure, a DD corresponding to a field device can be stored in non-volatile memory of the field device and uploaded to the host device. In this way, the host device can obtain a DD corresponding to a particular field device from the field device itself, thereby facilitating communications between the devices, such as for initialization and commissioning of the field device. Accordingly, the techniques can enable out-of-the-box communications between a field device and a host device while helping to minimize the chance that such communications fail due to incompatible versions of a field device and a DD used by the host system for communications. In some examples, the field device can store a plurality of storable configurations in non-volatile memory of the field device. Each storable configuration can represent an entire configuration (e.g., an operational state) of the field device. As such, rather than configure a field device using a series of sequential messages to transmit the configuration data, a host device can activate one of the plurality of storable configurations via a single message, thereby increasing the efficiency of configuration of the field device. In certain examples, the host device can request the field device to upload each of the plurality of storable configurations in response to a single upload request. In this way, a system implementing techniques of this disclosure can more efficiently replicate, or "clone," an active configuration of a field device or entire network of field devices, such as by transferring the storable configurations between field devices on the same or separate networks. Moreover, any one or more of the data transfers can utilize a fast data transfer communication protocol, such as a connectionless (e.g., broadcasting) communication protocol that does not require acknowledgments of each individual message for the data transfer. Accordingly, techniques described herein can enable efficient data transfers, such as for device configuration and/or cloning, thereby decreasing the time (and costs) associated with network maintenance, configuration, and commissioning activities.

Figure 1:
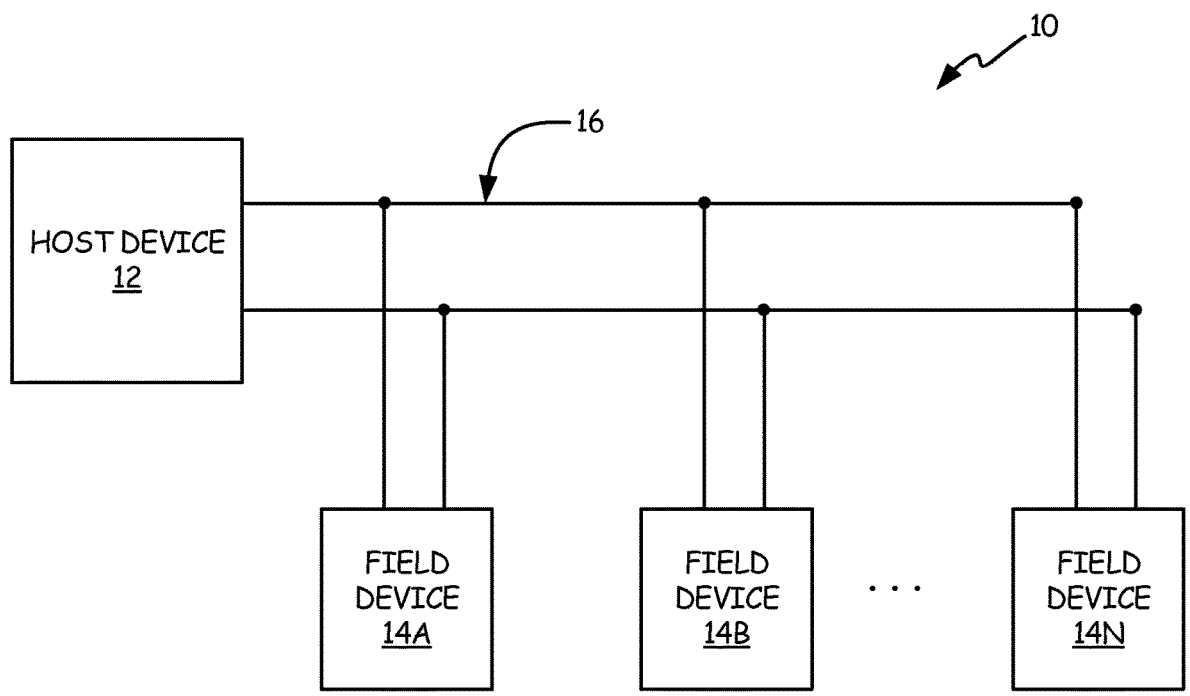
FIG. 1 is a block diagram illustrating an industrial process network including a host device and field devices that can transfer data, such as device descriptions and configuration data, according to techniques described herein.

FIG. 1 is a block diagram illustrating one embodiment of an industrial process network 10 that includes host device 12 and field devices 14A-14N (collectively referred to herein as "field devices 14") that can transfer data, such as DDs and configuration data, according to techniques described herein. Although network 10 will be described in the context of a process control/monitoring system using Foundation Fieldbus communication protocol with communication of messages over bus 16, techniques of this disclosure may have general applicability to digital networks having host and/or field devices that engage in message transactions.

Host device 12 may typically be located within a centralized control room in an industrial process plant. In other examples, host device 12 can be a handheld device that can be attached and detached from bus 16 at various locations. Bus 16 can be, for example, a two-wire twisted pair or a four-wire cable that provides a communication pathway over which messages can be sent. Bus 16 can support a plurality of devices on a single cable, although the number of devices on bus 16 may be based at least in part on a target loop execution speed and/or intrinsic safety requirements. Accordingly, field devices 14 are illustrated and described with respect to the example of FIG. 1 as including "N" field devices, where "N" represents an arbitrary number.

Host device 12 may typically act as a link active scheduler (LAS) of network 10. In its function as the LAS device, host device 12 maintains a central schedule for all communications between devices on bus 16. At least one of the other devices in network 10 (e.g., one or more of field devices 14) can be configured to act as a link master (LM) device. An LM device can be configured to take over scheduling responsibilities of the LAS device should the LAS device fail or become inoperable. In some examples, more than one LM device can be present on bus 16, thereby providing further backup for scheduling responsibilities.

Field devices 14, in some examples, can be process instruments that sense one or more process parameters and provide data based upon the sensed parameters. In certain examples, field devices 14 can be process actuators that provide a physical output based upon a command message received, e.g., over bus 16. In some examples, one or more of field devices 14 can be process instruments and one or more of field devices 14 can be process actuators. In certain examples, one or more of field devices 14 can include both sensing and actuating capabilities. Examples of field devices 14 include, but are not limited to, silicon pressure sensors, capacitive pressure sensors, resistive temperature detectors, thermocouples, strain gauges, limit switches, on/off switches, flow transmitters, pressure transmitters, capacitance level switches, weigh scales, transducers, valve positioners, valve controllers, actuators, solenoids, and indicator lights.

Operational interfacing and configuration of any one or more of field devices 14 can be accomplished using a device description (DD). Operational interfacing can include, among other things, data interpretation, such as interpretation of a type and/or units of data (e.g., process data, calibration data, or other types of data) output by one or more of field devices 14. A DD can be one or more files or other data structures including parameters descriptive of functional attributes of a field device (e.g., any one of field devices 14). For example, functional attributes can include, but are not limited to, data output types, valid data ranges (e.g., for each data output type), valid data units, and calibration data ranges. In addition, a DD can include information descriptive of how data (e.g., process data, calibration data, configuration data, or other types of data) should be organized and/or displayed by a calibration and/or configuration tool, such as a calibration and/or configuration tool including a graphical user interface executed by host device 12. For instance, a DD can include information such as parameter labels, a number of significant digits to be displayed, calibration and/or diagnostic menus, a list of available error codes and/or alerts, or other such information. In general, a DD can describe functional capabilities of a particular field device and, in some examples, information descriptive of how to organize and/or display configuration information, calibration information, and menus to facilitate configuration and commissioning of the field device.

Each of field devices 14 can be associated with a DD. In some examples, DDs associated with field devices 14 can differ between field devices 14. For instance, field device 14A can be associated with a first DD, and field device 14B can be associated with a second, different DD. In certain examples, two or more of field devices 14 can be associated with a same DD, such as when two or more of field devices 14 are substantially similar field devices configured to perform substantially similar functions. DDs can be formatted according to a device description language (DDL). A DDL can be a standardized computer-readable format (e.g., language) for describing functional attributes of a field device, thereby enabling a host device to interface with any field device using a DD that implements the DDL. In some examples, any one or more of field devices 14 can store a DD corresponding to the respective one of field devices 14 in non-volatile memory of the field device, as is further described below. In such examples, field devices 14 can transmit the DD stored in non-volatile memory to host device 12, thereby facilitating communications and decreasing the chance that communications and configuration fail due to incompatible versions of the DD.

In operation, host device 12 (or other configuration device) can interpret a DD corresponding to any one of field devices 14 to determine the functional attributes corresponding to the respective one of field devices 14. Host device 12 can transmit configuration data to the respective one of field devices 14 according to the functional attributes defined by the corresponding DD to establish an operational state of the respective one of field devices 14. For instance, host device 12 can interpret a first DD associated with field device 14A to determine functional attributes corresponding to field device 14A, such as data output types supported by field device 14A, valid data ranges corresponding to the data output types, or other functional attributes. Host device 12 can transmit configuration data to field device 14A to specify an operational state of field device 14A corresponding to the functional attributes (e.g., a specified data output type, specified data output units, ranges, etc.) Host device 12 can interpret a second DD associated with field device 14B to determine functional attributes corresponding to field device 14B, and can transmit configuration data (according to the DD) to field device 14B to specify an operational state of field device 14B.

In some examples, any one or more of field devices 14 can store a plurality of storable configurations in non-volatile memory of the respective one of field devices 14, as is further described below. A storable configuration (or configuration template) can include a set of configuration data corresponding to functional attributes of the field device that represents a complete configuration of the field device. In such examples, rather than transmit the configuration data to field devices 14 to specify the operational states of field devices 14, host device 12 can transmit one or more messages configured to cause field devices 14 to activate a selected one of the plurality of storable configurations stored in the non-volatile memory of field devices 14. In this way, techniques of this disclosure can decrease an amount of data transmitted over bus 16 to configure any one or more of field devices 14, thereby decreasing time and expense associated with the configuration.

In certain examples, host device 12 can retrieve a DD and/or storable configuration(s) stored in the non-volatile memory of field devices 14, and can store the DD and/or storable configuration(s) for later transmission to a different field device. For instance, host device 12 can retrieve a DD as well as one or more storable configurations stored in non-volatile memory of field device 14A. Host device 12 can transmit the storable configurations to a different field device, such as field device 14B, thereby effectively replicating configuration parameters (or "cloning") field device 14A. In certain examples, host device 12 can store DDs and storable configurations associated with each of field devices 14 as a storable network configuration (or network configuration template), such as a storable network configuration corresponding to industrial process network 10. Using the storable network configuration, host device 12 (or another configuration device) can transmit the storable configurations to a different industrial process network including field devices similar to field devices 14, thereby effectively replicating (i.e., cloning) industrial process network 10.

Field devices 14, operating in accordance with operational states defined by the respective configuration data, can transmit data, such as process data, via bus 16 to enable monitoring and control of an industrial process. As one example operation, host device 12 can act as a LAS device for network 10, thereby maintaining a central schedule for communications between any one or more of host device 12 and field devices 14 over bus 16. Host device 12 can initiate scheduled communications with field devices 14, such as by transmitting compel data messages to field devices 14, in turn, over bus 16 according to the central schedule. In response to receiving a compel data message, the respective one of field devices 14 can transmit its scheduled communications data over bus 16. Scheduled communications data can include, for example, process variable data sensed by the respective field device and used for control of the industrial process. As another example, scheduled communications data can include actuator state information (e.g., position information) of the respective one of field devices 14. In general, scheduled communications data can typically include data identified as critical to real-time operation and control of the industrial process network, such as data used by function blocks executing on field devices 14 to monitor and/or control operation of the industrial process.

As one example, host device 12 can transmit a compel data message to field device 14A at a time identified by the central schedule for scheduled communications with field device 14A. In response to receiving the compel data message, field device 14A can transmit its scheduled communications data over bus 16, such as process parameter data sensed by field device 14A (e.g., temperature data, pressure data, or other types of process parameter data). The transmitted data can be received by one or more of host device 12 and field devices 14B-14N (i.e., others of field devices 14) that are configured to receive data transmissions from field device 14A, often referred to as "subscriber" devices. Host device 12 can transmit compel data messages to each of field devices 14 that are included in a live list of devices (i.e., a list of field devices 14 configured to transmit data over bus 16) according to the schedule, thereby managing scheduled communications over bus 16 in a deterministic manner.

Host device 12 can further initiate unscheduled communications with field devices 14 via a token passing algorithm. According to the token passing algorithm, host device 12 can transmit a "pass token" message to each of field devices 14, in turn, to initiate unscheduled data transmissions from the respective field device. Unscheduled data transmissions can include, for instance, configuration data, alarm data, event data, trend data, diagnostic data, status data, data for operator displays, or other types of data. In general, unscheduled data can include any data not identified as critical to real-time operation of the industrial process network, such as data that is not used by function blocks executing on field devices 14 to monitor and/or control operation of the industrial process.

As an example, host device 12 can transmit a pass token message over bus 16 to field device 14A. Field device 14A, in response to receiving the pass token message, can transmit any unscheduled data identified (e.g., queued) by field device 14A for transmission over bus 16. Field device 14A can transmit the unscheduled data until all of the unscheduled data identified for transmission has been transmitted over bus 16, or until a configurable "maximum token hold time" has elapsed. The maximum token hold time parameter can effectively define an unscheduled data transmission time window within which field devices 14 can transmit unscheduled data. In some examples, each of field devices 14 can be configured with a same maximum token hold time, thereby defining a same length of time for unscheduled data transmissions for each of field devices 14. In other examples, one or more of field devices 14 be configured with different maximum token hold times.

In examples where the maximum token hold time elapses prior to a complete transmission of the unscheduled data, field device 14A can store (e.g., queue) the unsent data for later transmission, such as during the next unscheduled data transmission window. In examples where field device 14A transmits all of its unscheduled data prior to expiration of the maximum token hold time, field device 14A can transmit a token return message to host device 12 to indicate that it has completed its unscheduled data transmission. Host device 12 can transmit a pass token message to each of field devices 14, respectively, which can each transmit unscheduled data over bus 16 as described with respect to field device 14A. In this way, host device 12 can manage unscheduled data communications of field devices 14.

Scheduled and/or unscheduled communications over bus 16 can be accomplished via VCRs between any one or more of host device 12 and field devices 14. The VCRs provide connection-based channels for the transfer of data between devices on bus 16. Any one or more of host device 12 and field devices 14 can exchange data using the VCRs via messages having a format defined by the Fieldbus Message Specification (FMS). FMS messages transmitted via the connection-based VCRs include a message payload as well as overhead in the form of a message preamble, a start delimiter, a stop delimiter, and other meta data associated with the message. FMS messages transmitted via the connection-based VCRs are acknowledged with a corresponding acknowledgement message from the receiving device, thereby indicating that the message was received. Unacknowledged messages can be retransmitted, thereby increasing robustness of system communications.

In some examples, unscheduled data transmissions can include an amount of data that exceeds a maximum defined size of a corresponding FMS message. In such examples, the data can be transmitted via a plurality of FMS messages, each including an associated message preamble and other message overhead and requiring a corresponding acknowledgment from a receiving device. For instance, device configuration data and/or software image data (i.e., a set of computer-readable instructions executable by the device for operation of the device) can often span multiple FMS messages. In some cases, the amount of time to transmit the data can exceed a maximum token hold time allotted to the device, thereby causing the data to be transmitted across multiple unscheduled data transmission windows.

Accordingly, as described herein, one or more of host device 12 and field devices 14 can exchange data over bus 16 via a fast data transfer communication protocol. For instance, as is further described below, rather than transfer data via the connection-based VCR that includes corresponding acknowledgments for each transmitted message, one or more of host device 12 and field devices 14 can broadcast data using a connectionless communication protocol. According to the connectionless protocol, host device 12 and field devices 14 can broadcast data via bus 16 without requiring acknowledgment of individual messages. In this way, host device 12 and field devices 14 can transfer large amounts of data, such as configuration data, DDs, and/or software image data, more quickly than could otherwise be transferred via connection-based VCRs and corresponding FMS messages. Accordingly, techniques of this disclosure can decrease an amount of time (and associated expense) associated with such large-scale data transfers, such as transfers of DDs, storable configurations (e.g., configuration templates), or other information during device commissioning, device maintenance, debugging, or other activities.

Figure 2:
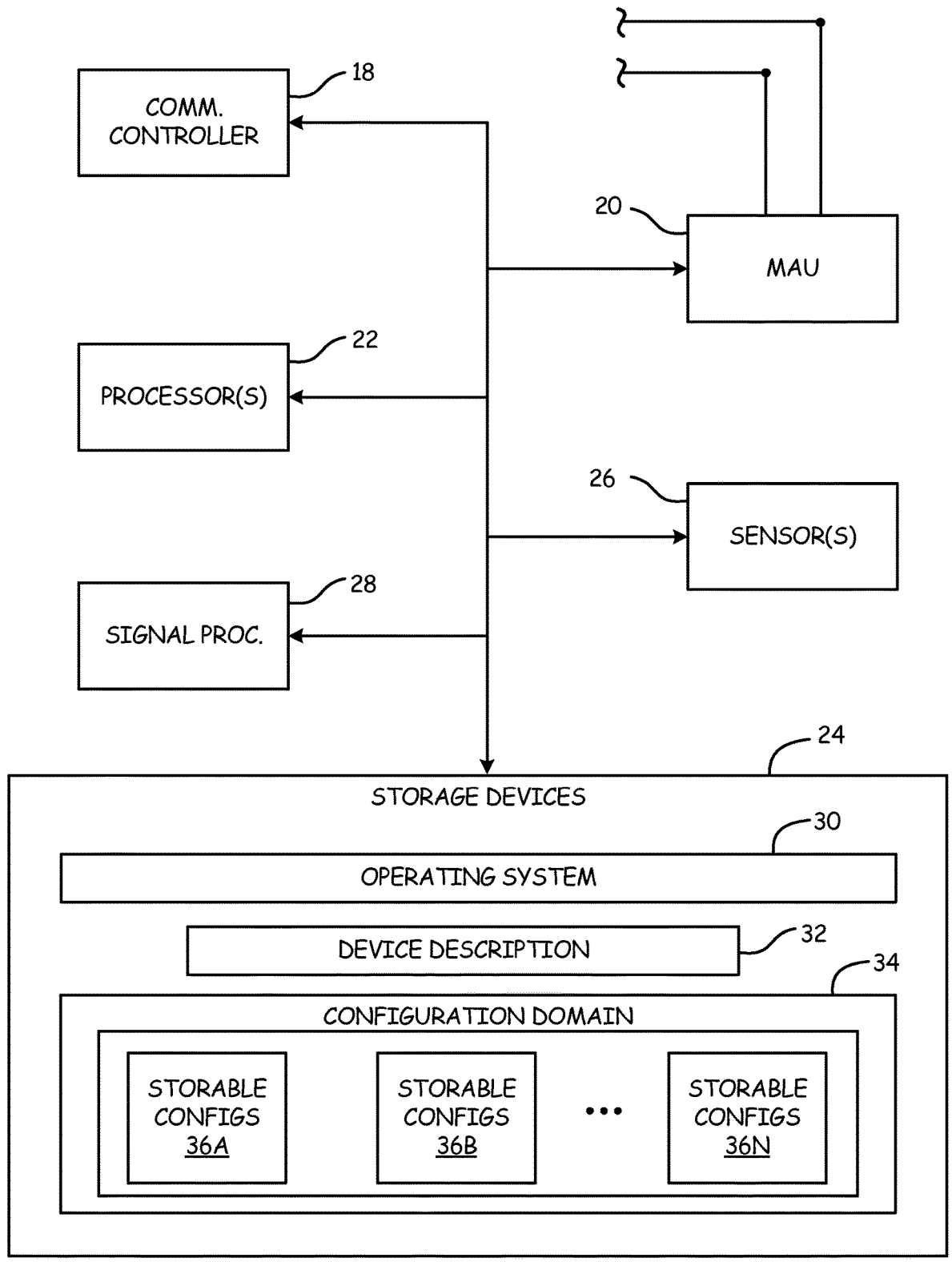
FIG. 2 is a block diagram of a field device.

FIG. 2 is a block diagram of one embodiment of field device 14A of FIG. 1. However, while illustrated and described with respect to field device 14A, it should be understood that field devices 14 of FIG. 1 can be substantially similar, such that field device 14A of FIG. 2 can be any of field devices 14.

As illustrated in FIG. 2, field device 14A can include communications controller 18, medium attachment unit (MAU) 20, processor(s) 22, storage device(s) 24, sensor(s) 26, and signal processing circuitry 28. Storage device 24 can include operating system 30, device description 32, and configuration domain 34. Configuration domain 34 can include storable configurations 36A-36N (collectively referred to herein as "storable configurations 36").

Sensor 26 can sense one or more process parameters or variables and provide corresponding sensor signals to signal processing circuitry 28. The sensor signals can include a primary variable (e.g., pressure) and a secondary variable (e.g., temperature). The secondary variable can be used by processor 22, in some examples, for correction or compensation of the sensor signal representing the primary variable. In certain examples, field device 14A can include two or more sensors 26. In some examples, two or more of sensors 26 can sense different primary and/or secondary variables. In some examples, data corresponding to a primary variable can be output by field device 14A as a primary data output of field device 14A. The data type of the primary data output can be considered a primary output data type of field device 14A.

Signal processing circuitry 28 typically includes analog-to-digital conversion circuitry, as well as filtering and other signal processing to place the sensor signals into a format that can be used by processor 22. For example, signal processing circuitry 28 can include any one or more sigma delta analog-to-digital converters and digital filters to provide digitized and filtered sensor signals to processor 22.

Processor 22, in one example, is configured to implement functionality and/or process instructions for execution within field device 14A, such as to coordinate the operation of field device 14A. For example, processor 22 can process instructions stored in storage device 24 to process data received over bus 16, receive and store sensor signals generated by sensor 26 (e.g., within storage device 24), and create and select data to be contained in messages that are transmitted from field device 14A over bus 16. Examples of processor 22 can include any one or more of a microprocessor, a controller, a digital signal processor (DSP), an application specific integrated circuit (ASIC), a field-programmable gate array (FPGA), or other equivalent discrete or integrated logic circuitry.

Storage device 24 can be configured to store information within field device 14 during operation. Storage device 24, in some examples, can be described as a computer-readable storage medium. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage device 24 is not long-term storage. Storage device 24, in some examples, is described as a volatile memory, meaning that storage device 24 does not maintain stored contents when power to field device 14A is turned off. Examples of volatile memories can include random access memories (RAM), dynamic random access memories (DRAM), static random access memories (SRAM), and other forms of volatile memories. In some examples, storage device 24 is used to store program instructions for execution by processor 22. For instance, storage device 24 can store instructions for execution of operating system 30 which, when executed by processor 22, can coordinate and/or control operation of components of field device 14A. Storage device 24, in one example, is used by software, firmware, or other application logic executing on processor 22 to temporarily store information during program execution.

Storage device 24, in some examples, also includes one or more computer-readable storage media. Storage device 24 can be configured to store larger amounts of information than volatile memory. Storage device 24 can further be configured for long-term storage of information. In some examples, storage device 24 includes non-volatile storage elements. Examples of such non-volatile storage elements can include magnetic hard discs, optical discs, floppy discs, flash memories, or forms of electrically programmable memories (EPROM) or electrically erasable and programmable memories (EEPROM).

Communications controller 18 can serve as an interface between processor 22 and MAU 20. For example, communications controller 18, which can be an ASIC, can receive data from MAU 20, decode the data, form the data into bytes, and provide message data to be read by processor 22. As another example, communications controller 18 can receive bytes of data from processor 22, format the data into messages, and provide messages to MAU 20 for transmission on bus 16. MAU 20 can provide network connection of field device 14A to bus 16. MAU 20 can be an integrated circuit or discrete components.

As illustrated in the embodiment of FIG. 2, storage device 24 can further include device description 32 and configuration domain 34. Configuration domain 34 can include storable configurations 36. Device description 32 can include data parameters descriptive of functional attributes of field device 14A. Device description 32, in some examples, can include a set of files organized in a hierarchical arrangement according to a primary function of each respective file within the set. For instance, the hierarchy of files can include, in hierarchical order, a universal parameters level, a function block parameters level, a transducer block parameters level, and a manufacturer specific parameters level. Files organized within the universal parameters level can include parameters of common attributes such as tag, revision, mode, or other common attributes. Files organized within the function block parameters level can include parameters defined for standard Foundation Fieldbus function blocks. Files organized within the transducer block parameters level can include parameters defined for standard Foundation Fieldbus transducer blocks. Files organized within the manufacturer specific parameters level can include parameters associated with function blocks and transducer blocks that are not defined by the Foundation Fieldbus standard.

Configuration domain 34 can be a partition or other segregated portion of storage device 24 configured to store storable configurations 36. Storable configurations 36 can include any number of storable configurations, as is denoted by storable configuration 36N, where "N" represents an arbitrary number. For instance, storable configurations 36 can, in certain examples, include three or more storable configurations. Each of storable configurations 36 can include a set of configuration data that represents an entire configuration of field device 14A to define an operational state of field device 14A. Examples of configuration data include data output types, data ranges, data units, alert types, alert triggers, or other data usable by field device 14A to define an operational state of field device 14A. In certain examples, each of storable configurations 36 can be considered a configuration template. In some examples, field device 14A can activate one of storable configurations 36 in response to receiving a storable configuration activation request from, e.g., host device 12. As such, field device 14A can reconfigure an operational state of field device 14A in response to receiving the storable configuration activation request.

Figure 3:
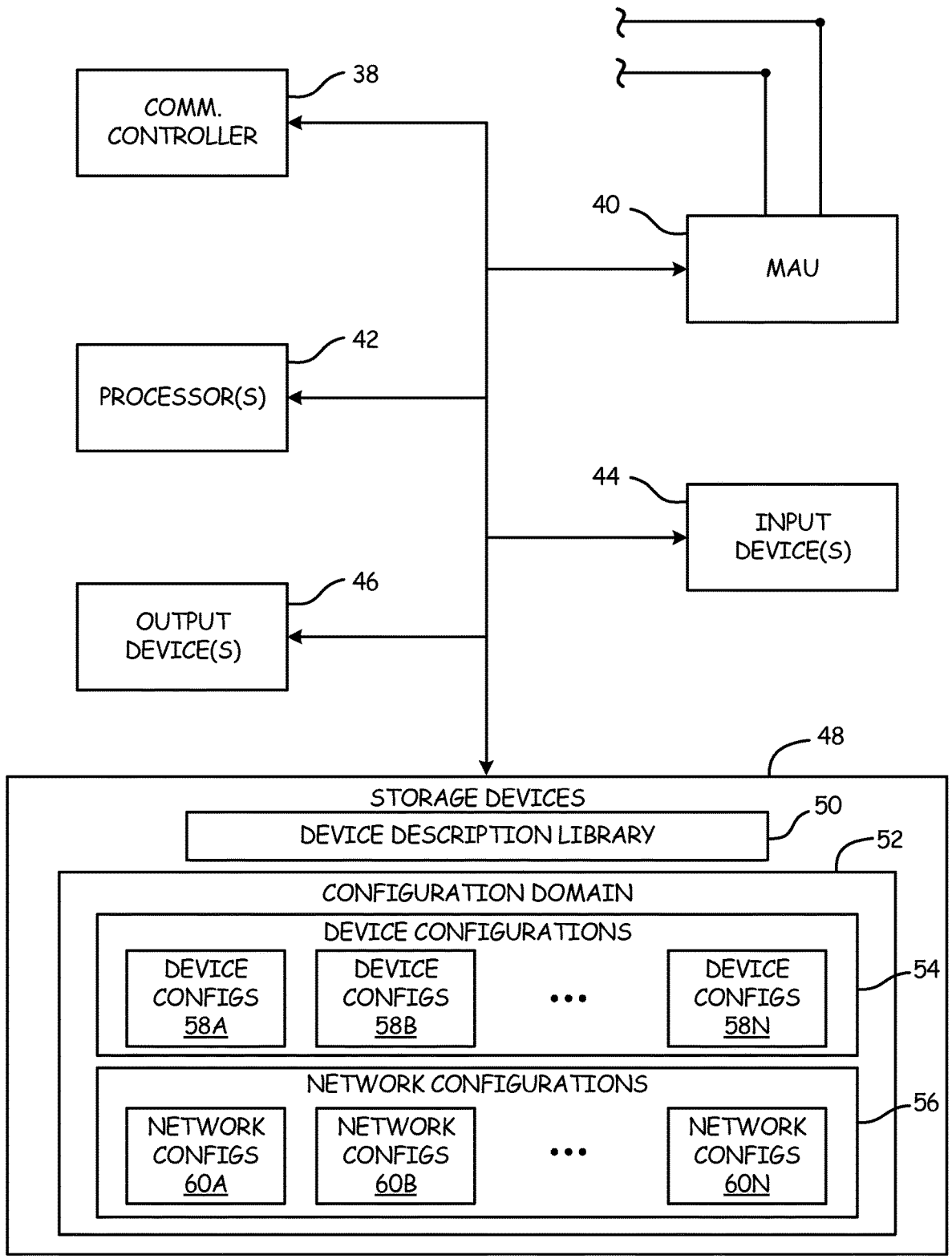
FIG. 3 is a block diagram of a host device.

FIG. 3 is a block diagram of one embodiment of host device 12 of FIG. 1. As illustrated, the overall architecture of host device 12 can be similar to that of field devices 14, and includes communications controller 38, MAU 40, processor(s) 42, input device(s) 44, output device(s) 46, and storage device(s) 48. Storage device 48 can include device description library 50 and configuration domain 52. Configuration domain 52 can include device configuration domain 54 and network configuration domain 56. Device configuration domain 54 can include device configurations 58A-58N (collectively referred to herein as "device configurations 58"). Network configuration domain 56 can include network configurations 60A-60N (collectively referred to herein as "network configurations 60"). Each of configuration domain 52, device configuration domain 54, and network configuration domain 56 can be partitioned or otherwise segregated portions of storage device 48. For instance, configuration domain 52 can be a segregated portion of storage device 48 configured to store device configuration and network configuration information. Device configuration domain 54 can be a portion of configuration domain 52, segregated from network configuration domain 56, and configured to store device configurations 58. Network configuration domain 56 can be a portion of configuration domain 52, segregated from device configuration domain 54, and configured to store network configurations 60. However, while storage device 48 is illustrated and described with respect to the embodiment of FIG. 3 as organizing device configurations 58 and network configurations 60 within configuration domain 52, device configuration domain 54, and network configuration domain 56, in other examples, storage device 48 may not organize device configurations 58 and network configurations 60 within segregated domains.

Device configurations 58 can include a plurality of configuration data sets corresponding to configurations (e.g., complete configurations) of field devices 14. For example, device configuration 58A can include one or more files or other data structures including configuration data corresponding to field device 14A. Device configuration 58B can include one or more files or other data structures including configuration data corresponding to field device 14B. In general, device configurations 58 can include configuration data sets corresponding to each of field devices 14. In certain examples, device configurations 58 can be storable configurations (e.g., configuration templates) corresponding to complete configurations of one or more of field devices 14.

Network configurations 60 can each include a plurality of configuration data sets, each configuration data set corresponding to a configuration (e.g., a complete configuration) of a field device associated with a particular network. For instance, network configuration 60A can include a group of configuration data sets, each of the configuration data sets corresponding to one of field devices 14. In this way, network configuration 60A can represent a complete configuration (e.g., operational state) of industrial process network 10. As illustrated, network configuration domain 56 can include a plurality of network configurations 60. As such, host device 12 can include network configurations 60 that provide a plurality of different network configurations. The plurality of different network configurations can correspond to a same or different network. For instance, each of network configurations 60 can correspond to a different configuration of industrial process network 10. In other examples, at least one of network configurations 60 can correspond to a configuration of a different industrial process network. As such, host device 12 can store, in non-volatile memory (e.g., storage device 48), a plurality of network configurations that represent different operational states of a same or different networks.

As illustrated in FIG. 3, host device 12 can further include input device(s) 44 and output device(s) 46. Input device 44, in some examples, is configured to receive input from a user. Examples of input device 44 can include any one or more of a mouse, a keyboard, a microphone, a presence-sensitive and/or touch-sensitive display, or other type of device configured to receive input from a user. Output device 46 can be configured to provide output to a user. Examples of output device 46 can include a sound card, a video graphics card, a speaker, a light emitting diode (LED), a display device such as a cathode ray tube (CRT) monitor or liquid crystal display (LCD), or other type of device for outputting information in a form understandable to users or machines.

In some examples, storage device 48 can be encoded with instructions which, when executed by processor 42, cause processor 42 to execute a user interface (UI) application configured to allow user interaction with one or more devices connected to network 10. For example, host device 12 can execute a UI application that accepts input via input device 44, such as input to identify one or more of field devices 14 and data to be uploaded to or downloaded from the identified one or more of field devices 14. For instance, host device 12 can execute a UI application that accepts input to cause host device 12 to upload and/or download DDs, storable configurations, configuration and/or calibration data, or other data with any one or more of field devices 14. As such, host device 12 can act as a configuration device for configuring, calibrating, and commissioning field devices 14 according to techniques described herein.

Figure 4:
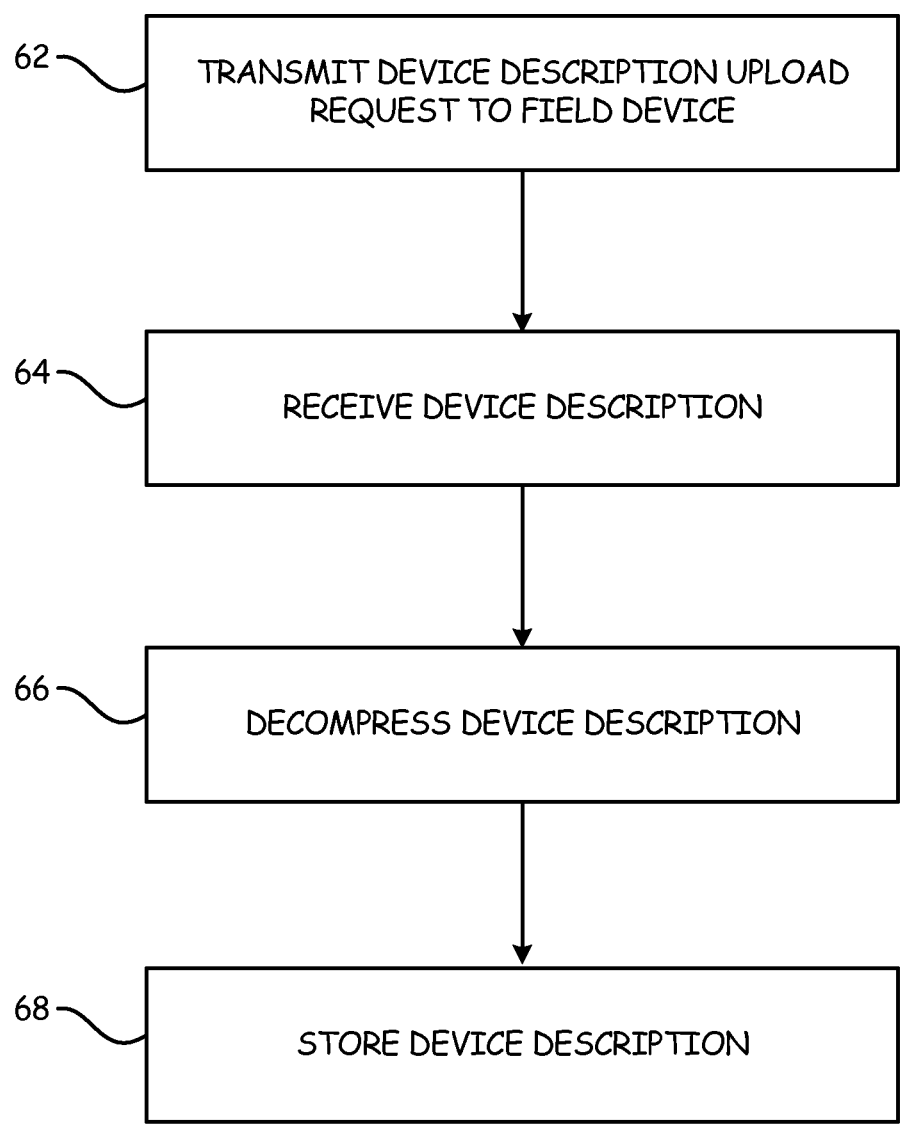
FIG. 4 is a flow diagram illustrating example operations for uploading a device description from a field device.

FIG. 4 is a flow diagram illustrating example operations for uploading a DD from a field device. While the example operations are described with respect to a uploading a device description from field device 14A to host device 12, the example operations can be applicable to DD uploads from any one or more of field devices 14 to host device 12.

Host device 12 can transmit a device description upload request via bus 16 to field device 14A to request field device 14A to upload the device description (e.g., device description 32) from field device 14A to host device 12 (step 62). In response to receiving the device description upload request, field device 14A can transmit device description 32 to host device 12 via one or more communication messages. Host device 12 can receive the device description (e.g., device description 32) via the one or more communication messages (step 64).

In some examples, host device 12 can configure a communications port of host device 12 for dedicated device description upload communications with field device 14A. In such examples, host device 12 can receive device description 32 via the one or more communication messages at the dedicated communications port. For instance, host device 12 can transmit an indication of the dedicated port (e.g., a network address, port identifier, or other indication of the dedicated port) as part of the device description upload request. Field device 14A can transmit device description 32 via one or more communication messages to the identified communications port. In certain examples, device description 32 can be compressed, e.g., via a lossless data compression algorithm, such as Lempel-Ziv (LZ), Lempel-Ziv-Welch (LZW), Lempel-Ziv-Renau (LZR), or other data compression algorithm. As one example, field device 14A can store device description 32 in a compressed state, and can transmit the compressed version of device description 32 to host device 12. As another example, field device 14A can store device description 32 in an uncompressed state, and can compress device description 32 according to the data compression algorithm prior to transmission to host device 12. In some examples, field device 14A can transmit to host device 12 an indication of the data compression algorithm used to compress device description 32, such as with a response to the device description upload request. In other examples, field device 14A may not store and/or transmit device description 32 in a compressed state, but may rather store and/or transmit the uncompressed device description 32 to host device 12.

Host device 12 can decompress the received device description (e.g., device description 32) in accordance with the data compression algorithm used to compress the device description (step 66). Host device 12 can store the received device description in non-volatile memory of host device 12 (step 68). For instance, host device 12 can store device description 32, received from field device 14A, in device description library 50 of storage device 48. Host device 12 can associate the stored device description 32 with field device 14A, such as by storing a device identifier of field device 14A with the stored device description 32. In some examples, host device 12 can store a compressed version of device description 32, and can decompress the device description 32 prior to accessing device description 32.

Accordingly, host device 12 can retrieve device description 32, associated with field device 14A, from field device 14A for use in communications with (e.g., configuration of) field device 14A. As described above, host device 12 can retrieve device descriptions from any one or more of field devices 14. In this way, a system implementing techniques of this disclosure can help to ensure that host device 12 can effectively interface with field devices without requiring prior retrieval of and access to device descriptions corresponding to each of field devices 14.

Figure 5:
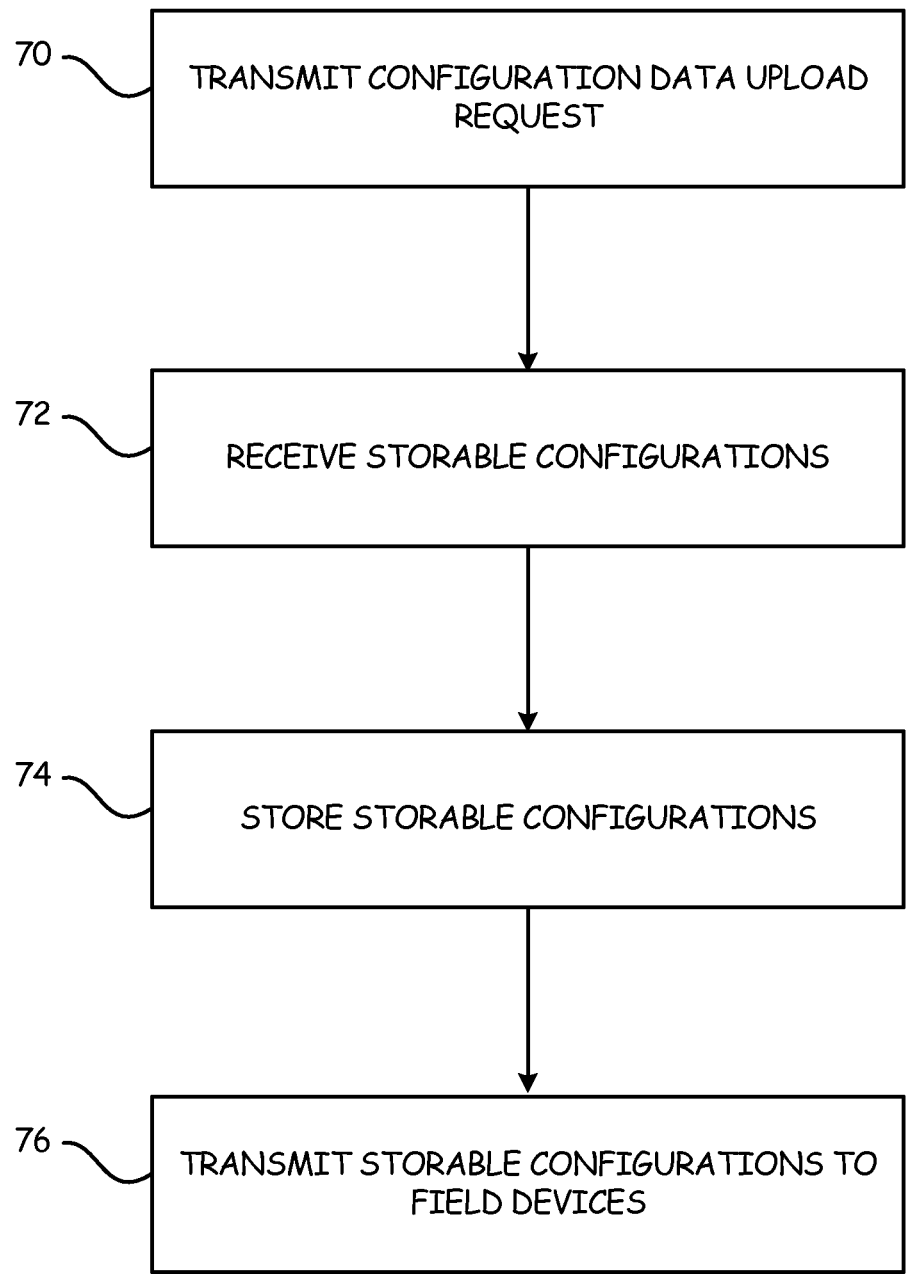
FIG. 5 is a flow diagram illustrating example operations for transferring storable configurations on an industrial process network.

FIG. 5 is a flow diagram illustrating example operations for transferring storable configurations on an industrial process network. While the example operations are described with respect to transferring storable configurations between field device 14A and host device 12, the example operations can be applicable to the transfer of storable configurations between any one or more of field devices 14 and host device 12.

Host device 12 can transmit, to field device 14A, a configuration data upload request to request field device 14A to upload a plurality of storable configurations stored in non-volatile memory of field device 14A from field device 14A to host device 12 (step 70). As an example, host device 12 can transmit a configuration data upload request to field device 14A, the configuration data upload request configured to request field device 14A to upload storable configurations 36, stored at storage device 24 (e.g., within configuration domain 34), to host device 12 via bus 16. As described above, each of storable configurations 36 can include configuration data used to configure one or more functional attributes of field device 14A, and can represent an entire configuration of field device 14A (e.g., a completely-configured operational state). In response to receiving the configuration data upload request, field device 14A can transmit storable configurations 36 to host device 12 via one or more communication messages. Host device 12 can receive the storable configurations via the one or more communication messages (step 72), and can store the storable configurations in non-volatile memory of host device 12 (step 74). For example, host device 12 can store the received storable configurations as one or more of device configurations 58 within device configuration domain 54 of storage device 48. Host device 12 can associate and/or store the received storable configurations with a device identifier that uniquely identifies field device 14A, thereby associating storable configurations 36 with field device 14A in the non-volatile memory of host device 12. In some examples, host device 12 can store the plurality of storable configurations 36 as one of device configurations 58 (e.g., device configuration 58A), thereby associating the plurality of storable configurations 36 corresponding to field device 14A with device configuration 58A of host device 12.

Host device 12 can transmit the plurality of storable configurations (e.g., storable configurations 36) to one or more different field devices (i.e., one or more field devices other than field device 14A) (step 76). As an example, host device 12 can transmit storable configurations 36, received from field device 14A, to field device 14B via bus 16 of industrial process network 10. As another example, host device 12 can transmit storable configurations 36 to a different field device connected to a different industrial process network, such as a different Fieldbus network remote from industrial process network 10. For instance, host device 12 can be a portable (e.g., handheld) device that can be connected and disconnected from disparate networks. Host device 12, storing storable configurations 36, can be disconnected from industrial process network 10 and connected to a second, different industrial process network, such as a second industrial process network that is physically remote from and not communicatively connected with industrial process network 10. Thereafter, host device 12 can transmit storable configurations 36 to a field device coupled to the second industrial process network, thereby effectively transferring storable configurations 36 between industrial process networks. As described above, host device 12 can retrieve storable configurations from any one or more of field devices 14 and can transfer the corresponding storable configurations between any of field devices 14 or other field devices connected to separate industrial process networks. Accordingly, techniques of this disclosure can enable a host device to efficiently retrieve and/or transfer a plurality of storable configurations stored at non-volatile memory of one or more field devices, each of the storable configurations representing an entire configuration of a corresponding field device.

Figure 6:
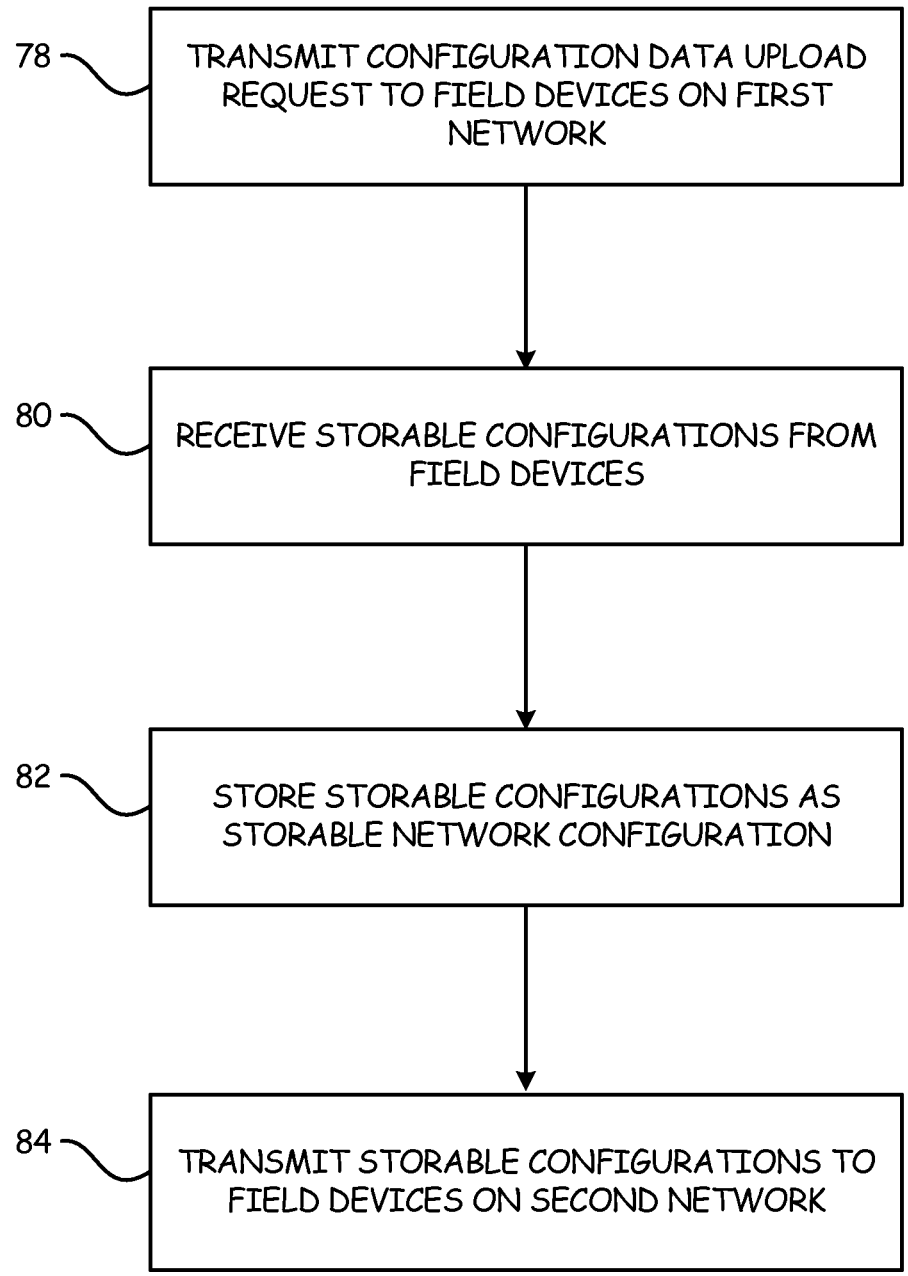
FIG. 6 is a flow diagram illustrating example operations for transferring a network configuration between industrial process networks.

FIG. 6 is a flow diagram illustrating example operations for transferring a network configuration between industrial process networks. Host device 12 can transmit a configuration data upload request to each of field devices 14 of industrial process network 10 (step 78). Each of the configuration data upload requests can be configured to request a corresponding one of field devices 14 to upload a plurality of storable configurations stored in non-volatile memory of the respective field device to host device 12. For example, host device 12 can transmit a first configuration data upload request to field device 14A, the first configuration data upload request configured to request field device 14A to transmit storable configurations 36 from field device 14A to host device 12 via bus 16. Host device 12 can transmit a second configuration data upload request to field device 14B, the second configuration data upload request configured to request field device 14B to transmit one or more storable configurations stored in non-volatile memory of field device 14B to host device 12 via bus 16. Host device 12 can transmit additional configuration data upload requests to each of field devices 14, thereby requesting each of field devices 14 to transmit storable configurations stored in non-volatile memory of each respective one of field devices 14 to host device 12 via bus 16.

Host device 12 can receive, via one or more communication messages, the plurality of storable configurations from each of field devices 14 (step 80). Host device 12 can store the plurality of received storable configurations as a storable network configuration (or template) within non-volatile memory of host device 12 (step 82). For instance, host device 12 can store the plurality of received storable configurations as network configuration 60A within network configuration domain 56 of storage device 48. Host device 12 can transmit network configuration 60A to field devices on a second industrial process network, different than industrial process network 10 (step 84). For instance, host device 12 can transmit storable configurations corresponding to network configuration 60A to each of a plurality of field devices connected to a second industrial process network that is physically remote from and not communicatively coupled to industrial process network 10. In this way, host device 12 can efficiently transfer operational states and/or configurations of entire networks of field devices, thereby increasing efficiency of configuration of networks.

Figure 7:
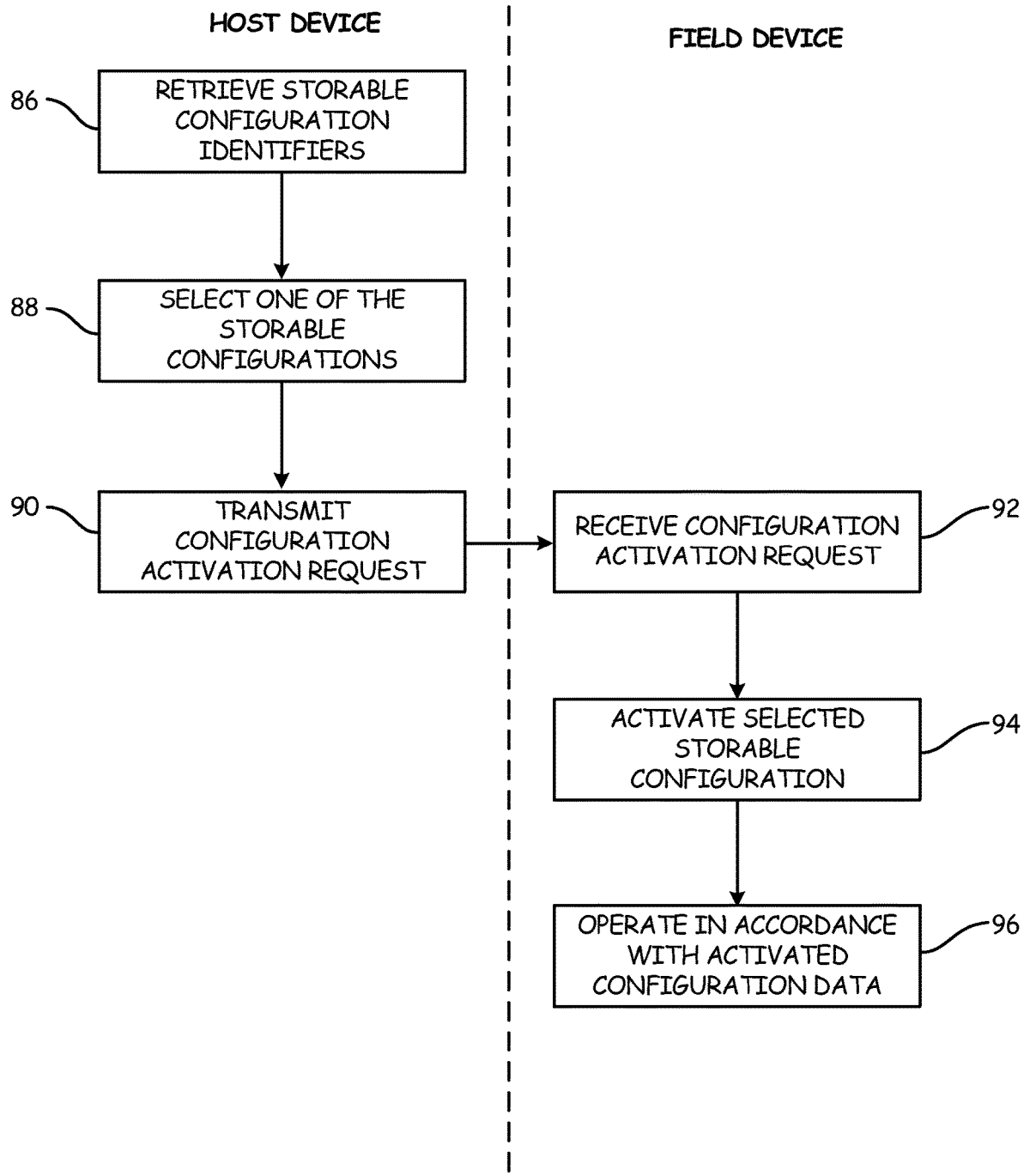
FIG. 7 is a sequence diagram illustrating example operations for activating one of a plurality of storable configurations stored at a field device.

FIG. 7 is a sequence diagram illustrating example operations for activating one of a plurality of storable configurations stored at a field device. While the example operations are described with respect to activating one of storable configurations 36 of field device 14A, the example operations can be applicable to the activation of storable configurations stored at any one or more of field devices 14.

Host device 12 can retrieve storable configuration identifiers corresponding to storable configurations 36 of field device 14A (step 86). For instance, host device 12 can store storable configurations 36 (e.g., as device configurations 58A) including a plurality of identifiers of each of storable configurations 36, each of the identifiers uniquely identifying one of the plurality of storable configurations 36. Host device 12 can select one of the storable configurations (step 88). For instance, host device 12 can select storable configuration 36A as a selected one of storable configurations 36. In some examples, host device 12 can receive, via a user interface, input to select the one of the plurality of storable configurations 36 (e.g., input to select storable configuration 36A). For example, storage device 48 of host device 12 can include computer-readable instructions which, when executed by processor 42, causes processor 42 to output a user interface configured to output information to a display device (e.g., output device 46, or a display device operatively coupled to but remote from host device 12) and to receive input (e.g., via input devices 44) to enable user interaction with host device 12 and field devices 14. Host device 12 can receive, in such examples, user input to select the one of the plurality of storable configurations 36 via the user interface.

Host device 12 can transmit a configuration activation request to field device 14A (step 90). The configuration activation request can include an identification of the selected one of the plurality of storable configurations (e.g., storable configuration 36A). The configuration activation request can be configured to request field device 14A to operate in accordance with configuration data included within the selected one of the plurality of storable configurations.

Field device 14A can receive the configuration activation request (step 92), and can activate the selected one of the plurality of storable configurations (step 94). For instance, field device 14A can receive the configuration activation request from host device 12 including the indication of storable configuration 36A as a selected one of storable configurations 36. In response to receiving the configuration activation request, field device 14A can activate storable configuration 36A by configuring operational parameters of field device 14A in accordance with the configuration data included in storable configuration 36A. Thereafter, field device 14A can operate in accordance with the activated configuration data (step 96).

In some examples, the activated one of the plurality of storable configurations can change a primary data type of an active data output of field device 14A. For instance, as described above, sensors 26 can include two or more sensors. Two or more of sensors 26 can be configured to sense and/or output data having different primary data types, such as pressure, temperature, density, flow rate, or other data types. The configuration data of the selected one of storable configurations 36 (e.g., storable configuration 36A) can cause field device 14A to output data having a different primary data type than a primary data type of an active data output of field device 14A. For instance, an active data output of field device 14A can be pressure, and configuration data of storable configuration 36A can cause field device 14A to output data having a primary data type of temperature. In this way, host device 12 can effectively change a primary output data type of field device 14A (or any of field devices 14) via a storable configuration activation request, thereby increasing efficiency of configuration of field devices 14 by decreasing an amount of configuration data transmitted via bus 16 for the reconfiguration.

Figure 8:
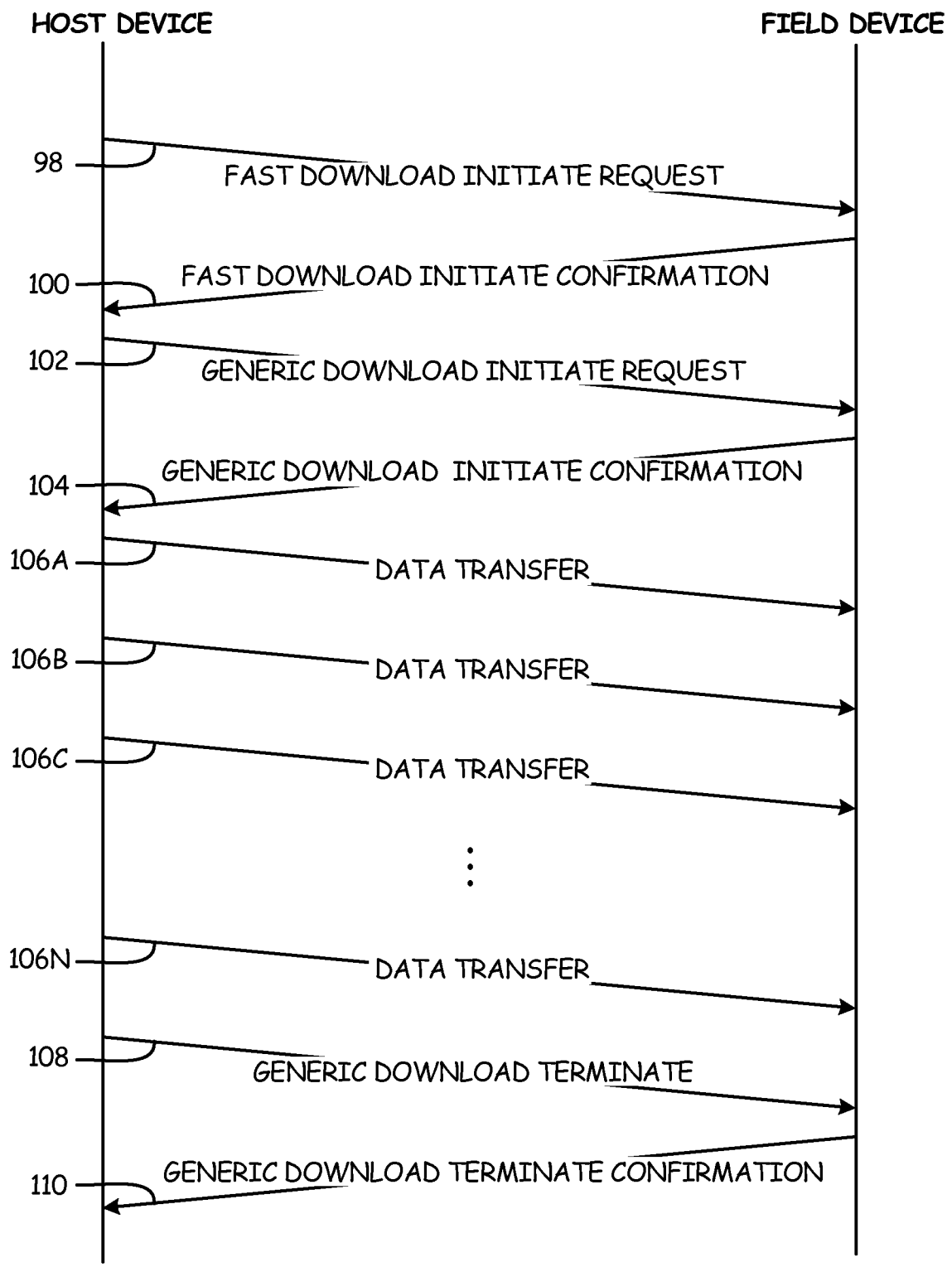
FIG. 8 is a sequence diagram illustrating a fast data download from a host device to a field device.

FIG. 8 is a sequence diagram illustrating example operations of a fast data download from host device 12 to field device 14A. While the example operations are illustrated and described with respect to a fast data download from host device 12 to field device 14A, the example operations can be applicable to fast data downloads from host device 12 to any one or more of field devices 14. In addition, the example operations can be applicable to a fast data download with respect to any transfer of data from host device 12 to field devices 14, such as the transfer of one or more storable configurations, one or more DDs, software image data, or other types of data.

Host device 12 can transmit a fast data transfer initiate request to field device 14A to request a subsequent data transfer between host device 12 and field device 14A via a fast data transfer communication protocol (message 98). For instance, host device 12 can transmit the fast data transfer initiate request in response to receiving an input (e.g., user input via a UI application) to download configuration data (e.g., one or more storable configurations), one or more DDs, and/or software image data to field device 14A. In some examples, host device 12 can transmit the fast data initiate request via a connection-based VCR established between host device 12 and field device 14A. In certain examples, the fast data transfer initiate request can include an indication of a requested data rate of the subsequent data transfer.

Field device 14A, responsive to receiving the fast data transfer initiate request, can transmit a fast data transfer confirmation to host device 12 indicating that field device 14A is configured for the subsequent data transfer via the fast data transfer communication protocol (message 100). In some examples, field device 14A can transmit the fast data transfer confirmation via the VCR established between host device 12 and field device 14A. In certain examples, such as when the fast data transfer initiate request received from host device 12 includes an indication of a requested data rate of the subsequent data transfer, the fast data transfer confirmation can include one or more of a confirmation of the requested data rate or an indication of a second requested data rate, different than the requested data rate received from host device 12. In this way, field device 14A and host device 12 can negotiate a data rate for the subsequent data transfer via the fast download initiate request and the fast download initiate confirmation.

Host device 12, responsive to receiving the fast data transfer confirmation, can transmit a generic data transfer initiate request to field device 14A to request the subsequent data transfer with field device 14A (message 102). In certain examples, host device 12 may not receive the fast data transfer confirmation from field device 14A. In such examples, host device 12 may retransmit the fast data transfer initiate request to field device 14A a threshold number of times or until host device 12 receives a fast data transfer confirmation message. The threshold number of retransmits can range from zero (in which case host device 12 does not retransmit the request) to any non-zero number, such as one, two, or more retransmits. If host device 12 does not receive the fast data transfer confirmation message, host device 12 can execute the subsequent data transfer via a plurality of FMS messages over the VCR, thereby helping to ensure interoperability of field devices and/or host devices operable to execute the fast data transfer protocol within networks that include field devices and/or host devices that are not operable to execute the fast data transfer protocol.

The generic download initiate request can be a data transfer message defined by the FMS and transmitted via the VCR established between host device 12 and field device 14A. The generic download initiate request can, in certain examples, include an indication of a category of data to be downloaded via the subsequent data transfer (e.g., configuration data, software image data, or other category of data). For instance, the generic download initiate request can indicate that a device description will be downloaded via the subsequent data transfer. As another example, the generic download initiate request can indicate that one or more (e.g., a plurality) of storable configurations will be downloaded via the subsequent data transfer.

As in the example of FIG. 8, the fast download initiate request and the generic download initiate request can be transmitted by host device 12 via separate messages. In other examples, the fast download initiate request and the generic download initiate request can be transmitted via a single message. For instance, the fast download initiate request can be appended to the generic download initiate request defined by the FMS. One or more of the fast download initiate request and the generic download initiate request can include a broadcast network address to which a plurality of messages will be broadcast during the subsequent data transfer.

Field device 14A can transmit, responsive to receiving the generic download initiate request, a generic download initiate confirmation to host device 12 (message 104), such as via the VCR between host device 12 and field device 14A. In addition, field device 14A can configure a communications interface (e.g., a port of MAU 20) to receive the subsequent data transfer at the broadcast network address associated with the subsequent data transfer.

In response to receiving the generic download initiate confirmation, host device 12 can initiate the subsequent data transfer with field device 14A via the fast data transfer communication protocol (e.g., a connectionless broadcasting protocol). For example, as illustrated in FIG. 8, host device 12 can execute the subsequent data transfer by broadcasting the subsequent data transfer via a plurality of broadcast messages (messages 106A-106N, collectively referred to herein as "broadcast messages 106"), such as to a broadcast network address included in one or more of the fast data transfer initiate request or the generic data transfer initiate request. Each of the plurality of broadcast messages 106 can include a portion of data associated with the subsequent data transfer. For instance, such as when the subsequent data transfer includes a plurality of storable configurations to be loaded and/or executed by field device 14A, each of broadcast messages 106 can include a portion of the data included in the plurality of storable configurations. Host device 12 can transmit broadcast messages 106 until the subsequent data transfer is complete. Accordingly, broadcast messages 106 are illustrated as including "N" broadcast messages, where "N" is an arbitrary number. In addition, in some examples, host device 12 can configure a maximum token hold time parameter of field device 14A to extend the time of unscheduled communications allotted to field device 14A. For instance, host device 12 can transmit a message (e.g., a message defined by the FMS to configure the token hold time) prior to transmitting broadcast messages 106. In this way, host device 12 can help to decrease the total time over which the subsequent data transfer operates by helping to ensure that the entire subsequent data transfer occurs within a single unscheduled communications window.

Host device 12 can transmit broadcast messages 106 consecutively to field device 14A without receiving acknowledgment from field device 14A that any one or more of broadcast messages 106 were received by field device 14A. In this way, host device 12 can help to decrease the amount of time over which the subsequent data transfer operates by reducing the messaging overhead and time associated with acknowledgment messages. In certain examples, each of broadcast messages 106 can include data positioning information that indicates a relative position of the data included in the respective broadcast message within the data associated with the subsequent data transfer. The data positioning information can include a beginning and/or ending memory address of data within the respective broadcast message. In certain examples, the data positioning information can include an indication of a sequential order of broadcast messages, such as an integer value representing the relative order of a particular broadcast message within the plurality of broadcast messages 106. As such, each of broadcast messages 106 can include data positioning information indicating a relative position of the associated data within the subsequent data transfer. Accordingly, in certain examples, field device 14A can compare the data positioning information received in broadcast messages 106 to determine whether any one or more of broadcast messages 106 was not received by field device 14A.

As one example, field device 14A can compare data positioning information included in broadcast message 106C with data positioning information included in broadcast message 106A to determine that data associated with broadcast message 106B was not received by field device 14A. In such examples, field device 14A can transmit a retransmit request to host device 12 indicating a request that host device 12 retransmit the portion of the data associated with the subsequent data transfer that was included in broadcast message 106B. Host device 12 can retransmit the requested broadcast message (e.g., broadcast message 106B) in response to receiving the retransmit request.

Host device 12 can transmit a generic download terminate message to field device 14A to indicate that the subsequent data transfer is complete (message 108). In some examples, the generic download terminate message can be transmitted via the VCR established between host device 12 and field device 14A. Field device 14A can transmit (e.g., via the VCR) a generic download terminate confirmation to host device 12 responsive to receiving the generic download terminate request (message 110).

Accordingly, host device 12 and field device 14A (or any one or more of field devices 14) can execute a fast data transfer communication protocol to download data, such as configuration data, DDs, and/or software image data, from host device 12 to field device 14A. The described fast data download can increase the speed and efficiency of data downloads from host device 12 to field devices 14, thereby increasing usability of industrial process network 10 to monitor and/or control the industrial process.

Figure 9:
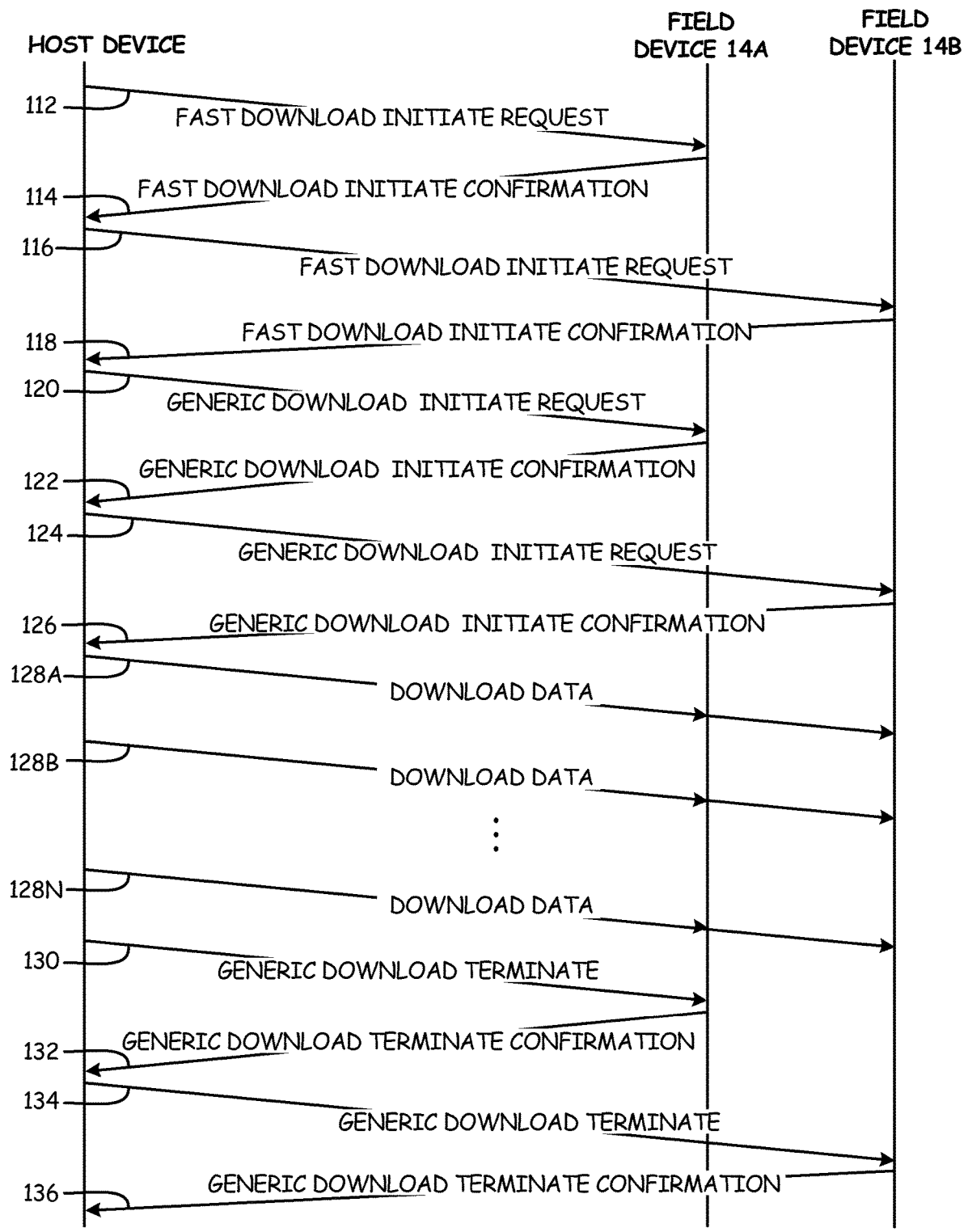
FIG. 9 is a sequence diagram illustrating a fast data download from a host device to multiple field devices.

FIG. 9 is a sequence diagram illustrating example operations of a fast data download from host device 12 to field devices 14A and 14B. As illustrated in FIG. 9, host device 12 can execute a fast data transfer communication protocol to broadcast a subsequent data transfer to a plurality of field devices 14. While illustrated and described with respect to a subsequent data transfer between host device 12 and two of field devices 14 (i.e., field device 14A and field device 14B), the example operations can be applicable to subsequent data transfers between host device 12 and any number of field devices 14 (e.g., each of field devices 14). In addition, the operations can be applicable to any data transfers to field devices 14, such as data transfers including a plurality of storable configurations, a DD download, or other such data transfers.

As illustrated, the example operations of FIG. 9 to execute a fast data download from host device 12 to multiple field devices 14 can be similar in nature to the example operations of FIG. 8 to execute the fast data download from host device 12 to a single one of field devices 14. In general, the example operations of FIG. 9 extend the fast data download to multiple field devices 14 via separate initiation and termination requests to each of the multiple field devices.

As illustrated in FIG. 9, host device 12 can transmit a fast data transfer initiate request to request a subsequent data transfer between host device 12 and field device 14A via a fast data transfer communication protocol (message 112). Responsive to receiving the fast data transfer initiate request, field device 14A can transmit a fast data transfer confirmation indicating that field device 14A is configured for the subsequent data transfer via the fast data transfer communication protocol (message 114). Host device 12 can further transmit a fast data transfer initiate request to field device 14B to request the subsequent data transfer between host device 12 and field device 14B (message 116). Responsive to receiving the fast data transfer initiate request, field device 14B can transmit a fast data transfer confirmation indicating that field device 14B is configured for the subsequent data transfer via the fast data transfer communication protocol (message 118).

Host device 12 can transmit a generic data transfer initiate request to field device 14A (message 120), which can responsively transmit a generic data transfer confirmation message to host device 12 (message 122). Host device 12 can transmit a generic data transfer initiate request to field device 14B (message 124). Field device 14B can transmit a generic data transfer confirmation message to host device 12 to indicate that field device 14B is configured for the subsequent data transfer (message 126). One or more of fast data transfer initiate request 112 and generic data transfer initiate request 120 to field device 14A can include a broadcast network address to which a plurality of messages will be broadcast during the subsequent data transfer. In addition, one or more of fast data transfer initiate request 116 and generic data transfer initiate request 124 to field device 14B can include the same broadcast network address to which the plurality of messages will be broadcast. Accordingly, host device 12 can execute the subsequent data transfer by broadcasting the subsequent data transfer via a plurality of broadcast messages (messages 128A-128N, collectively referred to herein as "broadcast messages 128"). As illustrated, broadcast messages 128 can be received by both field device 14A and field device 14B. In this way, rather than transmit separate messages to each of field devices 14A and 14B, host device 12 can execute the subsequent data transfer with both field device 14A and field device 14B via a same set of broadcast messages 128, thereby decreasing the amount of network traffic and execution time associated with the subsequent data transfer.

As further illustrated in FIG. 9, host device 12 can terminate the subsequent data transfer by transmitting a generic download terminate request to field device 14A (message 130), receiving a corresponding generic download terminate confirmation from field device 14A (message 132), transmitting a generic download terminate request to field device 14B (message 134), and receiving a corresponding generic download terminate confirmation from field device 14B (message 136).

Figure 10:
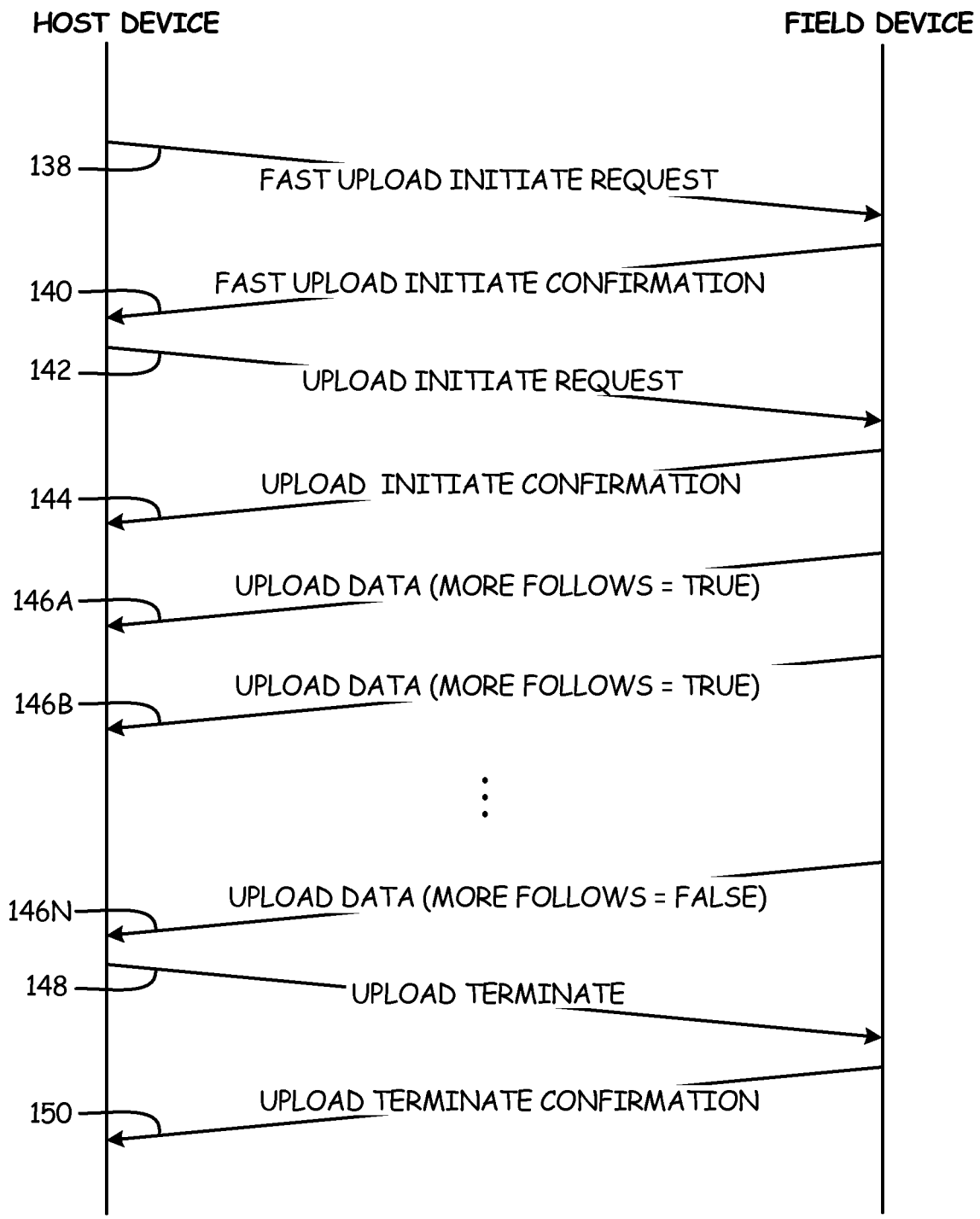
FIG. 10 is a sequence diagram illustrating a fast data upload from a field device to a host device.

FIG. 10 is a sequence diagram illustrating example operations of a fast data upload from field device 14A to host device 12. As illustrated in FIG. 10, host device 12 can initiate an upload of data, such as configuration data (e.g., storable configurations 36), a DD (e.g., device description 32), status data, software image data, or other types of data via a fast data transfer communication protocol. While described with respect to field device 14A, the example operations can be applicable to any of field devices 14.

Host device 12 can transmit a fast upload initiate request to field device 14A to request a subsequent data upload from field device 14A to host device 12 via a fast data transfer communication protocol (message 138). In some examples, the fast upload initiate request can be transmitted via a connection-based VCR between host device 12 and field device 14A. Field device 14A, responsive to receiving the fast upload initiate request, can transmit (e.g., via the VCR) a fast upload initiate confirmation indicating that field device 14A is configured for the subsequent data upload via the fast data transfer communication protocol (message 140). In response to receiving the fast upload initiate confirmation, host device 12 can transmit an upload initiate request (message 142), which in certain examples can be a FMS message sent via the VCR and configured to initiate a data upload. In some examples, the upload initiate request (message 142) can be considered a generic upload initiate request. Field device 14A can transmit an upload initiate confirmation (e.g., via the VCR) indicating that field device 14A is configured for the subsequent data upload (message 144). In certain examples, the upload initiate confirmation (message 144) can be considered a generic upload initiate confirmation. One or more of the fast upload initiate request 138 and the upload initiate request 142 can include an indication of a broadcast network address at which host device 12 is configured to receive the subsequent data upload. Field device 14A can execute the subsequent data upload via a plurality of broadcast messages (messages 146A-146N, collectively referred to herein as "broadcast messages 146") transmitted to the broadcast network address identified in fast data upload initiate request 138 and/or upload initiate request 142.

Field device 14A can transmit broadcast messages 146 sequentially without receiving an acknowledgment that host device 12 has received any one or more of broadcast messages 146. In some examples, each of broadcast messages 146 can include data positioning information indicating a relative position of data associated with a broadcast message within the data associated with the subsequent data upload. Host device 12 can compare the received data positioning information to determine whether any one or more of broadcast messages 146 was not received by host device 12. Host device 12 can send a retransmit request to field device 14A in response to determining that a broadcast message was not received, the retransmit request including an indication of the determined one of broadcast messages 146 that was not received by host device 12.

Each of broadcast messages 146 can include an indication of whether the broadcast message is last in the sequence of broadcast messages 146. For instance, as illustrated, broadcast message 146N can include an indication (e.g., a bit or byte) that broadcast message 146N is last in the sequence of broadcast messages, and others of broadcast messages 146 can include an indication that they are not the last in sequence.

Responsive to receiving a last in sequence of broadcast messages 146, host device 12 can terminate the subsequent data upload by transmitting an upload terminate request to field device 14A (message 148), which can transmit an upload terminate confirmation in response (message 150).

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of transferring configuration data on an industrial process network, the method comprising:
   transmitting, by a host device to a field device, a single configuration data upload request without sending any additional commands and without sending any acknowledgement messages after the single configuration data upload request is sent to request the field device to upload a plurality of individually activatable configurations stored in a non-volatile memory of the field device from the field device to the host device responsive to the single configuration data upload request, wherein each individually activatable configuration includes configuration data used to configure one or more functional attributes of the field device and represents an entire configuration of the field device;
   receiving, by the host device, the plurality of individually activatable configurations via one or more communication messages from the field device responsive to the single configuration data upload request; and
   storing, by the host device, the plurality of individually activatable configurations in a non-volatile memory of the host device.

2. The method of claim 1, wherein the field device comprises a first field device, wherein the one or more communication messages comprises one or more first communication messages, the method further comprising:
   transmitting, by the host device to a second field device, the plurality of individually activatable configurations via one or more second communication messages.

3. The method of claim 2, wherein receiving the plurality of individually activatable configurations via the one or more first communication messages from the first field device and transmitting the plurality of individually activatable configurations to the second field device are performed via a connectionless fast data transfer communication protocol.

4. The method of claim 2,
   wherein the industrial process network comprises a first industrial process network;
   wherein the first field device is coupled to the first industrial process network; and
   wherein the second field device is coupled to a second, different industrial process network.

5. The method of claim 1, wherein the field device comprises a first field device, wherein the single configuration data upload request comprises a first single configuration data upload request, wherein the plurality of individually activatable configurations comprises a first plurality of individually activatable configurations, wherein the configuration data comprises first configuration data, and wherein the one or more communication messages comprise one or more first communication messages, the method further comprising:
   transmitting, by the host device to a second field device, a second single configuration data upload request to request the second field device to upload a second plurality of individually activatable configurations stored in a non-volatile memory of the second field device from the second field device to the host device responsive to the second single configuration data upload request, wherein each individually activatable configuration of the second plurality of individually activatable configurations includes second configuration data used to configure one or more functional attributes of the second field device and represents an entire configuration of the second field device;
   receiving, by the host device, the second plurality of individually activatable configurations via one or more second communication messages from the second field device responsive to the second single configuration data upload request; and
   storing, by the host device, the second plurality of individually activatable configurations in the non-volatile memory of the host device.

6. The method of claim 5, wherein storing the first plurality of individually activatable configurations and the second plurality of individually activatable configurations in the non-volatile memory of the host device comprises storing the first plurality of individually activatable configurations and the second plurality of individually activatable configurations as a storable network configuration within the non-volatile memory of the host device.

7. The method of claim 1,
   wherein transmitting the single configuration data upload request to the field device is performed via a connection-oriented communication session between the host device and the field device; and
   wherein receiving the plurality of individually activatable configurations via the one or more communication messages from the field device is performed via a connectionless communication protocol.

8. A field device comprising:
   at least one processor;
   one or more storage devices; and
   a transceiver configured to send and receive data over an industrial process network;
   wherein the one or more storage devices store a plurality of individually activatable configurations, each individually activatable configuration including configuration data used to configure one or more functional attributes of the field device and representing an entire configuration of the field device; and
   wherein the one or more storage devices are encoded with instructions that, when executed by the at least one processor, cause the field device to:
     receive, via the transceiver, a single configuration data upload request from a host device to request the field device to upload the plurality of individually activatable configurations to the host device; and
     transmit the plurality of individually activatable configurations via the transceiver, wherein the transceiver transmits the plurality of individually activatable configurations in response to receiving the single configuration data upload request without receiving any additional commands and without receiving any acknowledgement messages from the host device.

\* \* \* \* \*